United States Patent
Harris et al.

(10) Patent No.: US 9,984,579 B1
(45) Date of Patent: May 29, 2018

(54) UNMANNED AERIAL VEHICLE APPROACH NOTIFICATION

(71) Applicant: Amazon Technologies, Inc., Seattle, WA (US)

(72) Inventors: Scott Raymond Harris, Bainbridge Island, WA (US); Barry James O'Brien, Seattle, WA (US); Jason Leonard Peacock, Bellevue, WA (US); Joshua John Watson, Seattle, WA (US); Scott Michael Wilcox, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 113 days.

(21) Appl. No.: 15/195,695

(22) Filed: Jun. 28, 2016

(51) Int. Cl.
| | |
|---|---|
| *G06G 7/70* | (2006.01) |
| *G08G 5/00* | (2006.01) |
| *G06K 9/00* | (2006.01) |
| *B64C 39/02* | (2006.01) |
| *B64D 47/06* | (2006.01) |
| *G05D 1/10* | (2006.01) |
| *G06Q 50/28* | (2012.01) |
| *H04L 12/58* | (2006.01) |
| *H04W 4/02* | (2018.01) |

(52) U.S. Cl.
CPC ......... *G08G 5/0069* (2013.01); *B64C 39/024* (2013.01); *B64D 47/06* (2013.01); *G05D 1/101* (2013.01); *G06K 9/00369* (2013.01); *G06Q 50/28* (2013.01); *H04L 51/20* (2013.01); *H04W 4/021* (2013.01); *B64C 2201/128* (2013.01)

(58) Field of Classification Search
None
See application file for complete search history.

(56) References Cited

U.S. PATENT DOCUMENTS

2006/0167599 A1 * 7/2006 Bodin ................ G08G 5/0069
701/16
2017/0129603 A1 * 5/2017 Raptopoulos ......... B64C 39/024

* cited by examiner

*Primary Examiner* — Adam M Alharbi
(74) *Attorney, Agent, or Firm* — Lee & Hayes, PLLC

(57) ABSTRACT

An unmanned aerial vehicle (UAV) may provide an approach notification to enable people to understand and interpret actions by the UAV, such as an intention to land or deposit a package at a particular location. The UAV may communicate a specific intention of the UAV and/or communicate a request to a person. The UAV may monitor the person or data signals for a response from the person, such as movement of the person that indicates a response. The UAV may be equipped with hardware and/or software configured to provide notifications and/or exchange information with a person at or near a destination. The UAV may include lights, a speaker, and possibly a projector to enable the UAV to project information and/or text on a surface. The UAV may control a moveable mechanism to "point" toward the person, at an object, or in another direction.

20 Claims, 9 Drawing Sheets

US 9,984,579 B1

UNMANNED AERIAL VEHICLE APPROACH NOTIFICATION

BACKGROUND

Unmanned aerial vehicles (UAVs), along with robots and other autonomous objects, are being used to perform tasks that were previously performed by people. For example, a UAV may deliver a package to a residence instead of a courier delivering the package. When people perform tasks, the people often abide by social norms. For example, the courier may enter personal property using a walkway that leads to a front door, a mailbox, or porch when delivering a package. The courier may knock on a door, ring a doorbell, or take other action to announce his/her presences at the residence. However, UAVs may enter airspace above a property and deposit a package somewhere on that property. In the scenario where the UAV delivers the package, social norms and/or customs may not be pre-established. Thus, a property owner or resident of property may be alarmed or confused when a UAV approaches the property.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to providing unmanned aerial vehicle (UAV) approach notification to enable people to understand and interpret actions by the UAV, such as an intention to land or deposit a package at a particular location. In some embodiments, the UAV may communicate an action or intention of the UAV and/or a request to a person. The request may be a request to land, a request to deposit a package, a request to provide information (e.g., verify a destination or location, verify identify of the person, etc.), a request to move an obstacle (e.g., put the dog in the house, etc.), and/or another type of request to enable the UAV to complete a task. In various embodiments, the UAV may monitor the person or signal data for a response, such as movement of the person that indicates a response or receipt of a reply message (e.g., a signal via a wireless communication, etc.).

The UAV may be equipped with hardware and/or software configured to provide notifications and/or exchange information with a person at or near a destination. For example, the UAV may include one or more lights and/or a speaker that may be used to provide notifications to the person. In some embodiments, the UAV may include a projector to enable the UAV to project information and/or graphics on a surface, such as the ground. The projector may be used to display and label a landing zone or drop zone used to deposit a package on the ground, for example. The UAV may communicate with a device associated with the person, who may be a resident, customer, etc., such as by sending a message via a local network, a telephone network, and/or other wireless communication protocols and/or networks. For example, the UAV may send a text-based message to a smartphone associated with an expected recipient of the package to notify the expected recipient that the UAV is arriving and will be depositing the package soon or within a predetermined amount of time. The UAV may perform maneuvers or control other hardware in order to communicate with the person at or near the destination. For example, the UAV may control a moveable mechanism, such as a gimbaled component, to "point" toward the person, at an object, or in another direction. As another example, the UAV may perform a predetermined aerial maneuver prior during an approach to the destination or while above the property, which may be associated with a message (e.g., need a designated drop zone, need to remove obstacle, etc.) or action (e.g., landing soon, etc.).

The techniques, UAVs, and systems described herein may be implemented in a number of ways. Example implementations are provided below with reference to the following figures.

Figure 1:
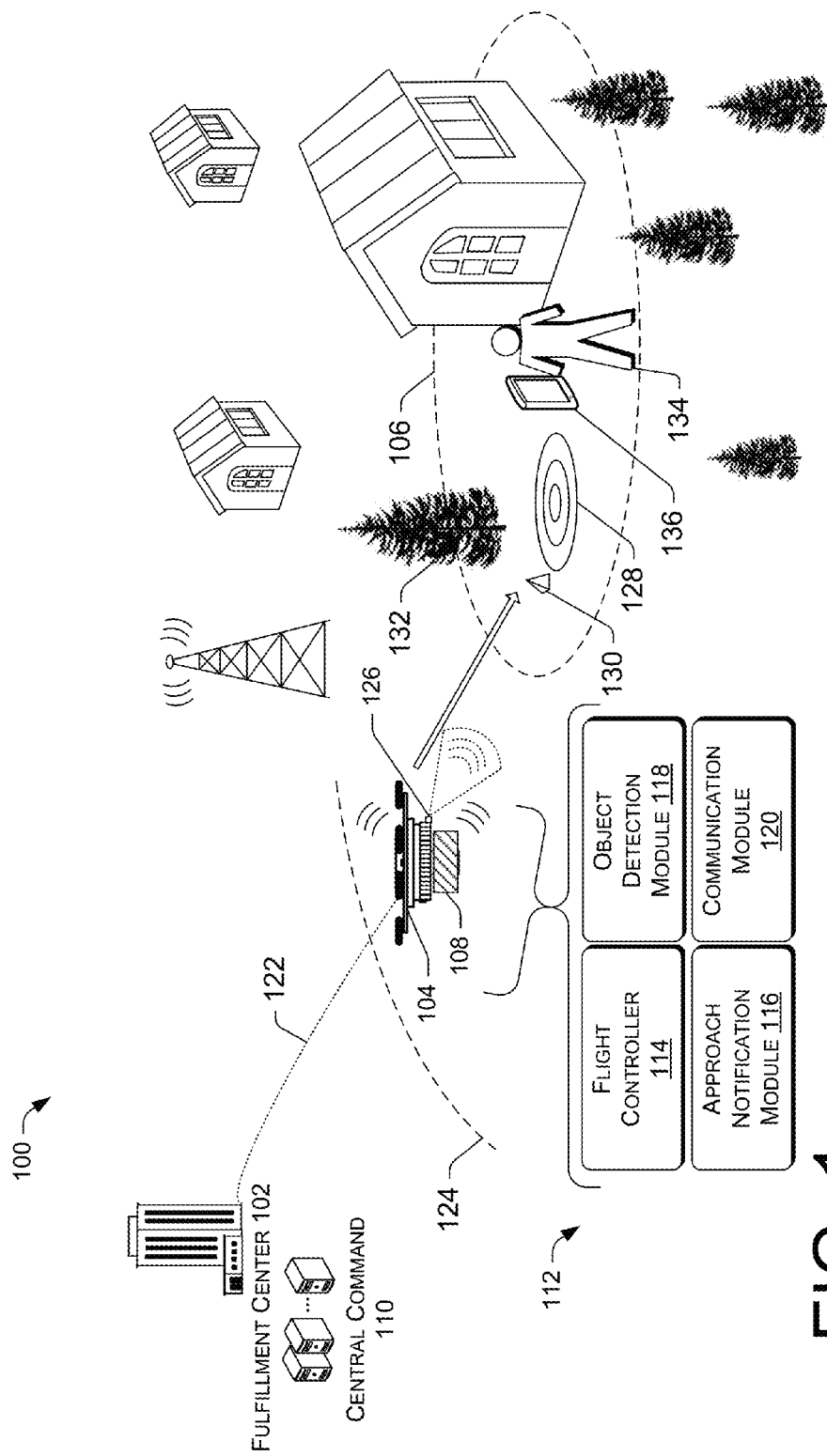
FIG. 1 is a schematic diagram of an illustrative environment that includes an unmanned aerial vehicle (UAV) providing one or more approach notifications.

FIG. 1 is a schematic diagram of an illustrative environment 100 that includes a UAV providing one or more approach notifications. The environment 100 includes a fulfillment center (FC) 102 where a UAV 104 may originate a flight directed to a destination 106, such as a location associated with a recipient of a package 108 transported by the UAV 104. The UAV 104 may receive some flight information and/or commands from a central command 110. The central command 110 may communicate with the UAV 104 via a wireless network, such as a network that utilizes one or more antennas and/or other hardware. The UAV 104 may also, at times, conduct autonomous flight, such as during intervals between communications from the central command 110 and/or when communication with the central command 110 is not available.

The UAV may be equipped with a number of components 112 to enable the UAV 104 to perform operations during the delivery of the package. The components 112 may include a flight controller 114, an approach notification module 116, an object detection module 118, and a communication module 120, as well as other components discussed below with reference to FIG. 2.

The UAV 104 may travel, under control of the flight controller 114, along a flight path 122 toward the destination 106. Eventually, the UAV 104 may reach or cross a threshold distance 124 from the destination 106, which may be detected by the flight controller 114 and/or a navigation system. For example, the UAV 104 may determine that the UAV reached or crossed the threshold distance 124 from the destination 106 based on global positioning system (GPS) location data and/or based on signals received by onboard sensors (e.g., proximity sensors, imaging sensors, transceivers, etc.). The threshold distance 124 may be a location above a property associated with the destination, such as when the threshold distance 124 is at a location that is a certain altitude over the property. However, the threshold distance 124 may be a location that is not over the property associated with the destination 106, but may be over adjacent property, for example. The UAV 104 may be executing, via the flight controller 114, an approach flight maneuver when the UAV 104 reaches or crosses the threshold distance 124.

The UAV 104 may use one or more sensors 126 to detect a drop zone (DZ) 128 to deposit the package 108 at the destination 106. The drop zone 128 may be a landing zone, or may be a location where the package is to be deposited or dropped onto while the UAV 104 remains in flight. In some embodiments, the drop zone 128 may be marked by a marker 130. The marker 130 may be moveable, such as by a person. The sensors 128 may detect the marker 130 when the marker 128 is used to detect the drop zone 128. However, the drop zone 128 may be designated in other ways, such as by GPS coordinates or as a specific feature (porch, deck, walkway, etc.). The sensors 128 may detect an obstacle 132, such as a tree or any other object that may interfere with the UAV 104 and/or the package 108 being deposited at the destination 106 (e.g., such as a dog, clothes line, fence, etc.). The sensors 128 may detect presence of a person 134, who may be a recipient of the package 108, a bystander, and/or another person. The person 134 may or may not be on the property associated with the destination 106, but may be located proximate to the property, such as at a neighboring property, on a sidewalk or other public property, or at an adjacent location.

The approach notification module 116 may cause the UAV 104 to perform one or more actions during the approach toward the destination 106 to inform the person 134 about intentions and/or actions of the UAV and/or make a request to the person and/or otherwise communicate with the person, possibly using the communication module 120. For example, the UAV 104 may cause lights to be activated in a predetermined manner to indicate that the UAV 104 is on an approach and intends to land or deposit the package 108 at the destination 106. The UAV 104 may "announce" its arrival via the lights and/or via audio, such as by emitting a warning sound, a pleasant tune, or other audio that provides notification of the presence of the UAV and/or an intent of the UAV 104 to deposit the product 108 at the destination 106. In some embodiments, the UAV 104 may project light, via a projector, onto a surface at or near the destination, such as to show or illuminate the drop zone 128. For example, the drop zone 128 may not be marked, but may exist as a GPS coordinate or other location, which can be marked or made visible by projecting light on the ground or another surface. On approach, the UAV 104 may project light on the drop zone 128 to enable the person 134 to see the drop zone 128. In various embodiments, the approach notification module 116 may cause the UAV 104 to perform special maneuvers and/or controls that may indicate that the UAV 104 intends to deposit the package 108 at the destination. For example, the UAV 104 may perform specific and/or unusual maneuvers, such as rotating around an axis that is perpendicular to the ground, wobbling, moving up/down repeatedly, and/or performing other maneuvers that indicate actions to be performed by the UAV 104. These actions, when viewed by the person 134, may enable the person 134 to determine the intent of the UAV 104, for example.

In some embodiments, the object detection module 118 may cause the UAV 104 to take actions to indicate that obstacles exist and/or have been detected by the UAV via the sensors 126 onboard the UAV 104. For example, the object detection module 118 may cause the UAV 104 to project light on a determined obstacle, point a moveable mechanism at an obstacle (possibly via maneuvering the UAV 104), and/or emitting light in a direction of the obstacle, such as by activating a light on a side of the UAV facing the obstacle. The object detection module 118 may perform similar actions to indicate to the person 134 that the UAV has detected his/her presence, such as via signals obtained by the sensors 126 (e.g., imaging sensor signals, thermal sensors, etc.).

In accordance with one or more embodiments, the communication module 120 may communicate a message to the person 134 and/or request a response from the person 134. For example, the communication module 120 may communicate a request for the person 134 to move an obstacle (e.g., put a dog in the house, turn off a sprinkler, etc.), designate a drop zone by placing the marker 130 on the property of the destination 106, move away from a detected drop zone, and/or take other actions. The communication module 120 may communicate with the person 134 by sending wireless signals to a device 136 associated with the person. For example, the communication module 120 may send a short message service (SMS) text message, a multimedia messaging service (MMS) message, an email, and/or other type of message to an address or phone number associated with the person 134 when the person is a known person (e.g., the recipient of the package, a resident of the destination, etc.). The communication module 120 may transmit messages using other techniques and message services, such as via a Bluetooth® protocol, a Wi-Fi protocol, and/or via other techniques. In some embodiments, the message may include an image provided by the UAV 104, such as an image that designates one or more possible locations to drop the package 108 at the destination 106. The possible locations may request a user selection, which may be communicated by a reply message or other action by the user (e.g., physical movement, pointing, etc.).

In various embodiments, the communication module 120 may communicate with the person 134 via other techniques that rely on detection, by the communication module 120, of physical actions performed by the person 134. For example, the communication module 120 may request the user to answer a yes/no question by taking a first action if the response is "yes" or taking a second, different action if the response is "no". For example, the actions could involve moving to a different location, jumping, waving arms, and/or performing other physical actions. The UAV 104 may include sensors to detect the actions and software to interpret those actions to process a response to a question. Thus, the UAV may communicate with people using various techniques.

Figure 2:
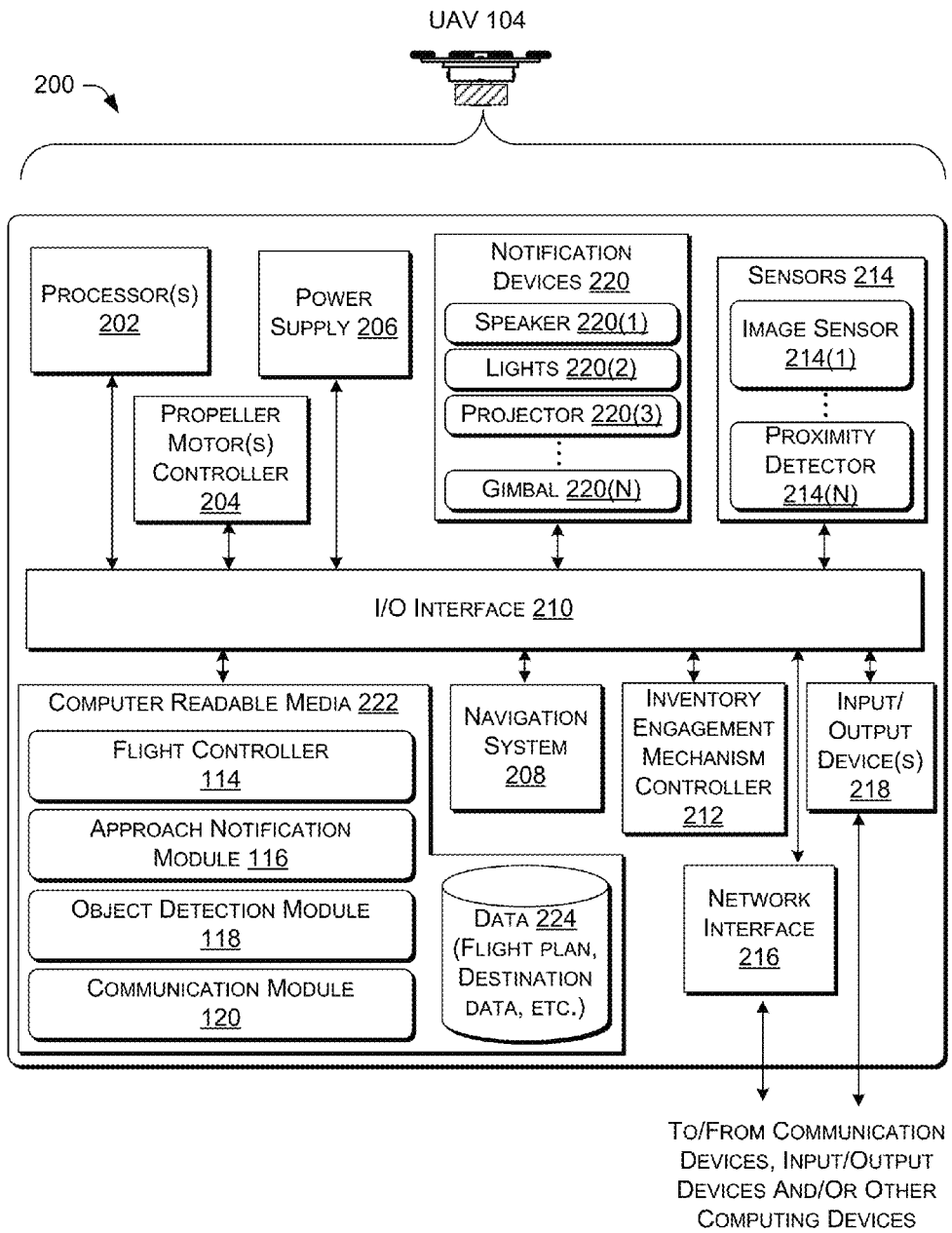
FIG. 2 is a block diagram of an illustrative UAV architecture of the UAV shown in FIG. 1.

FIG. 2 is a block diagram of an illustrative UAV architecture 200 of the UAV 104. The UAV architecture 200 may be used to implement the various systems, devices, and techniques discussed above. In the illustrated implementation, the UAV architecture 200 includes one or more processors 202, coupled to a non-transitory computer readable media 222 via an input/output (I/O) interface 210. The UAV architecture 200 may also include a propeller motor controller 204, power supply module 206 and/or a navigation system 208. The UAV architecture 200 further includes an inventory engagement mechanism controller 212 to interact with the package 108, sensors 214, a network interface 216, one or more input/output devices 218, and notification devices 220.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 222 may be configured to store executable instructions/modules, data, flight paths, and/or data items accessible by the processor(s) 202. In various implementations, the non-transitory computer readable media 222 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 222 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 216.

In one implementation, the I/O interface 210 may be configured to coordinate I/O traffic between the processor(s) 202, the non-transitory computer readable media 222, and any peripheral devices, the network interface or other peripheral interfaces, such as input/output devices 218. In some implementations, the I/O interface 210 may perform any necessary protocol, timing or other data transformations to convert data signals from one component (e.g., non-transitory computer readable media 222) into a format suitable for use by another component (e.g., processor(s) 202). In some implementations, the I/O interface 210 may include support for devices attached through various types of peripheral buses, such as a variant of the Peripheral Component Interconnect (PCI) bus standard or the Universal Serial Bus (USB) standard, for example. In some implementations, the function of the I/O interface 210 may be split into two or more separate components, such as a north bridge and a south bridge, for example. Also, in some implementations, some or all of the functionality of the I/O interface 210, such as an interface to the non-transitory computer readable media 222, may be incorporated directly into the processor(s) 202.

The propeller motor(s) controller 204 communicates with the navigation system 208 and adjusts the power of each propeller motor to guide the UAV along a determined flight path. The power supply module 206 may control the charging and any switching functions associated with one or more power modules (e.g., batteries) of the UAV.

The navigation system 208 may include a GPS or other similar system that can be used to navigate the UAV to and/or from a location. The inventory engagement mechanism controller 212 communicates with the actuator(s) or motor(s) (e.g., a servo motor) used to engage and/or disengage inventory, such as the package 108. For example, when the UAV is positioned over a level surface at a delivery location, the inventory engagement mechanism controller 212 may provide an instruction to a motor that controls the inventory engagement mechanism to release the package 108.

The sensors 214 may include an image sensor 214(1), a proximity sensor 214(N), and/or other sensors used to detect the obstacle 132, the marker 130, the person 134, and/or other items or objects. For example, the sensors 214 may monitor actions performed by the person 134 to collect one or more signal that, when analyzed, indicate a response intended by the person in response to a request issued by the UAV 104.

The network interface 216 may be configured to allow data to be exchanged between the UAV architecture 200, other devices attached to a network, such as other computer systems, and/or with UAV control systems of other UAVs. For example, the network interface 216 may enable wireless communication between numerous UAVs. In various implementations, the network interface 216 may support communication via wireless general data networks, such as a Wi-Fi network. For example, the network interface 216 may support communication via telecommunications networks such as cellular communication networks, satellite networks, and the like.

The input/output devices 218 may, in some implementations, include accelerometers and/or other input/output devices commonly used in aviation. Multiple input/output devices 218 may be present and controlled by the UAV architecture 200. One or more of these sensors may be utilized to assist in landings as well as avoiding obstacles during flight. The notification devices 220, which may be used for other purposes and may be a subset of the input/output devices 218, may include additional input/output devices. The notification devices 220 may include one or more of a speaker 220(1), lights 220(2), a projector 220(3), and/or a moveable mechanism (e.g., a gimbal component) 220(N). The moveable mechanism 220(N) may be any mechanism that enable directing a component on the UAV 104 to "point" in a particular direction, among other possible reasons/functions. The notification devices may be used by approach notification module 116, the object detection module 118, and/or the communication module 120, as discussed herein.

In some embodiments, the computer readable media 222 may store the flight controller 114, the approach notification module 116, the object detection module 118, and the communication module 120. The components may access and/or write data 224, which may include flight plan data, log data, destination data, and so forth. The operations of the flight controller 114, the approach notification module 116, the object detection module 118, and the communication module 120 are described above, and also below by way of various illustrative processes.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. Additional information about the operations of the modules of the UAV 104 is discussed below.

FIGS. 3, 4, 8, and 9 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

Figure 3:
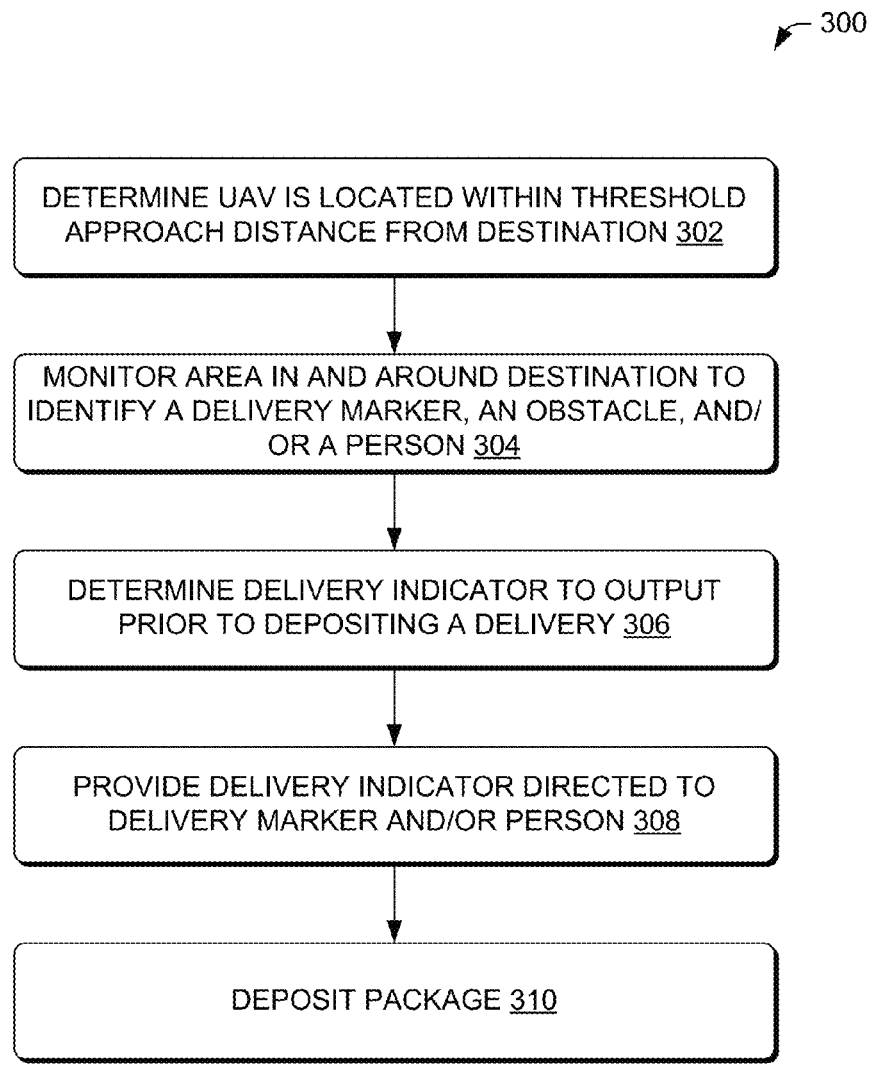
FIG. 3 is a flow diagram of an illustrative process to provide a delivery indicator directed to a delivery marker, drop zone, and/or a person.

FIG. 3 is a flow diagram of an illustrative process 300 to provide a delivery indicator directed to a delivery marker, drop zone, and/or a person. The process 300 is described with reference to the environment 100 and the architectures 200.

At 302, the flight controller 114 may determine that the UAV 104 is located within a threshold approach distance from a destination, such as the destination 106. The flight controller 114 may determine that the UAV 104 is located within a threshold approach distance from a destination based on GPS location in comparison with coordinates associated with the destination, based on visual information obtained by sensors, or using other techniques. The threshold approach distance may be associated with a horizontal distance from the destination, a vertical distance (altitude), or both.

At 304, the object detection module 118 may monitor an area in and around the destination to identify a delivery marker (e.g., the marker 130), an obstacle (e.g., the obstacle 132), and/or a person (e.g., the person 134). For example, the object detection module 118 may control sensors to obtain sensor data associated with the area in and around the destination, which may include image data, thermal data, proximity data, time of flight data for depth measurements, and/or other types of data used to determine presence of objects and possibly identify the objects. In some embodiments, the object detection module 118 may use object detection algorithms and/or facial detection algorithms to determine a type of object and/or an identity of a person. The type and/or identity may then be used to determine if the object is a threat to the UAV, to determine how to provide a notification to the object or person, and/or for other reasons discussed herein. As an example, the object detection module 118 may determine that a person is wearing a certain color or type of clothing item (e.g., a blue shirt, a white hat, etc.), and may announce to that person a command, such as "person with the blue shirt and white hat, please move toward the house," or another command that identifies attributes of the person or object (e.g., black dog, yellow sprinkler, etc.).

At 306, the approach notification module 116 may determine a delivery indicator to output prior to depositing a delivery, such as the package 108 at the destination 106. The approach notification module 116 may select the delivery indicator from various different types of communications, and based on the objects, obstacles, and/or presence of people (or other living beings) in or around the destination. For example, the approach notification module 116 may select for an audio output, an output of lights, causing the UAV to perform a special maneuver, cause movement of a moveable mechanism, transmit a wireless message to a device associated with a recipient of the delivery and/or cause other actions or outputs from the UAV.

At 308, the approach notification module 116 may cause an output device to deliver the delivery indicator directed to the person and/or directed to the delivery marker, which may provide a signal to a person near the delivery marker. The approach notification module 116 may initiate the delivery after the UAV is determined to be within the threshold distance based on performance of the operation 302. In some instances, the approach notification module 116 may wait until the UAV is within a specific location over or near the destination, the object, the person, and/or the obstacle before delivering the delivery indicator. In various instances multiple delivery indicators may be provided by the approach notification module 116, such as an approach indicator, a drop package or land indicator, a takeoff indicator, and so forth. Different delivery indicators may be delivered at different times or based on different triggers. For example, a trigger may be detected presence of a person, an animal, and/or an obstacle, which may occur as the UAV approaches the destination before or after the detection determined at the operation 302.

At 310, the inventory engagement mechanism controller 212 may cause the UAV 104 to disengage the package 108 to leave the package at the destination. For example, the inventory engagement mechanism controller 212 may cause the disengagement of the package while the UAV is airborne or after the UAV lands at or near the delivery zone.

Figure 4:
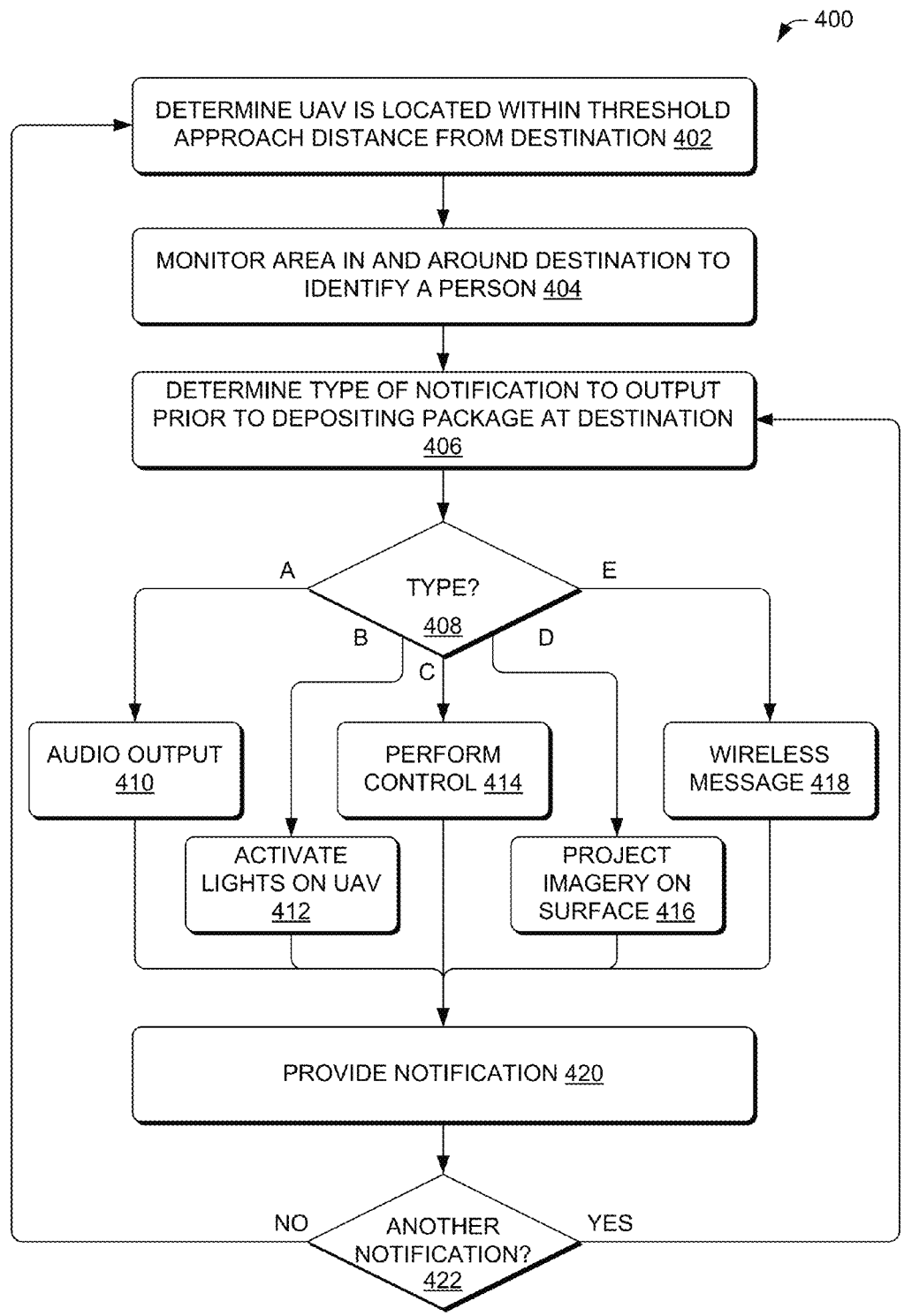
FIG. 4 is a flow diagram of an illustrative process to determine a type of approach notification to provide based on surveyed attributes of a destination.

FIG. 4 is a flow diagram of an illustrative process 400 to determine a type of approach notification to provide based on attributes of a destination. The process 400 is described with reference to the environment 100 and the architectures 200.

At 402, the flight controller 114 may determine that the UAV 104 is located within a threshold approach distance from a destination, such as the destination 106. The operation 402 may be the same or similar to the operation 302 described above.

At 404, the object detection module 118 may monitor an area in and around the destination to identify presence of a person (e.g., the person 134). For example, the object detection module 118 may control sensors to obtain sensor data associated with the area in and around the destination, which may include image data, thermal data, proximity data, time of flight data for depth measurements, and/or other types of data used to determine objects. In some embodiments, the object detection module 118 may use facial detection algorithms to determine an identity of a person.

At 406, the approach notification module 116 may determine a type of notification to output prior to depositing a delivery, such as the package 108 at the destination 106. The type of notification may be determined at a decision operation 408.

Following at route "A" from the decision operation 408, the process 40 may advance to an operation 410 and output audio as the notification. For example, the audio may be music, a warning sound, a soothing sound, an animal sound, and/or other types or sounds to indicate approach of the UAV and/or warn the person and/or other living beings about presence of the UAV.

Following at route "B" from the decision operation 408, the process 400 may advance to an operation 412 and activate lights on the UAV as the notification. The lights may be color coded to provide different information, such as green for "good", yellow or orange for "caution", and red for "danger". However, other colors may be used and/or the colors may indicate other types of information. For example, the colors may indicate a stage of the approach as initial approach, landing, takeoff, etc. In some embodiments, the lights be sequenced on/off either singly or with other lights, such as to create animation and/or illuminate lights in a particular direction for a particular reason. For example, the lights may be illuminated on a side of the UAV nearest or facing a person to indicate to the person that the UAV has identified the presence of the person. Similarly, the lights may be illuminated on a side of the UAV nearest or facing an obstacle to indicate to a person that the UAV has identified the presence of the obstacle. In some instances, the lights may animate to show a convergence at the location proximate to the obstacle, which may enable a person located on a different side of the UAV to determine presence of the lights.

Following at route "C" from the decision operation 408, the process 400 may advance to an operation 414 and perform a control as the notification. The control may be a special maneuver by the UAV to indicate information to the person. For example, the UAV may rotate about an axis perpendicular to the ground, wobble, fly up/down, and/or perform other flight maneuvers, under control of the flight controller 114, to indicate information to the person, such as that the UAV is approaching a destination, is about to land, is about to drop a package, and/or is about to perform another operation. In some embodiments, the control may be a control to move a moveable mechanism on the UAV, such as a gimbaled pointer or device that is otherwise moveable about the UAV. The movement of the moveable mechanism may indicate information to the person. For example, by causing the moveable mechanism to be pointed at the person or moved toward the person, the UAV may indicate to the person that the UAV has detected presence of the person. Of course, other indications are also possible, such as to point to a direct in which the UAV is headed, point to an obstacle to be removed or secured (e.g., a dog, a clothes line, etc.), point to a direction where the UAV requests the person to move to, and/or to indicate other information.

Following at route "D" from the decision operation 408, the process 400 may advance to an operation 416 and project imagery on a surface as the notification. The projected information may be a projection on a surface or a location of a surface where the UAV 104 plans to land or deposit the package 108. For example, the delivery zone may be projected on the ground or on another surface via a projector. In some embodiments, the projection may communicate information to a person. For example, the projection may include text, identify an obstacle, request action by a user (e.g., move, do something, etc.), and/or include other information. The projection may be limited to lighting conditions present at the destination when the UAV arrives or approaches the destination. For example, projecting content may be difficult or have poor results at high noon on a sunny day. However, projection may work in shaded location and/or in the early morning or late evening, as well as at night.

Following at route "E" from the decision operation 408, the process 400 may advance to an operation 418 and transmit a wireless message as the notification. The wireless message may be directed to a device associated with a person. For example, when the UAV identifies the person, the UAV may determine a device address and/or telephone number to use to send a message to the device of the person. The message may be sent using a mobile telephone network, Wi-Fi, Bluetooth®, and/or other long range or short range communication protocols. In some embodiments, the message may be made available to devices within a threshold distance from the UAV. The message may include a request for information or action by the user. In some embodiments, communications via this route may enable the person to modify control of the UAV, such as by instructing the UAV where to deposit the package, when to deposit the package, not to deposit the package, and/or provide other instructions to the UAV 104.

Following any one or more of the operations, 410-418, the process 400 may advance to an operation 420 to provide one or more notifications determined at the decision operation 408. In some embodiments, multiple notifications may be performed in parallel or in a series, as described next. At a decision operation 422, the approach notification module 116 may determine whether to provide another notification. When the approach notification module 116 determines to provide another notification (following the "yes" route from the decision operation 422), then the process 400 may advance to the operation 406. When the approach notification module 116 determines not to provide another notification (following the "no" route from the decision operation 422), then the process 400 may advance to the operation 402, such as at a different location.

Figure 5:
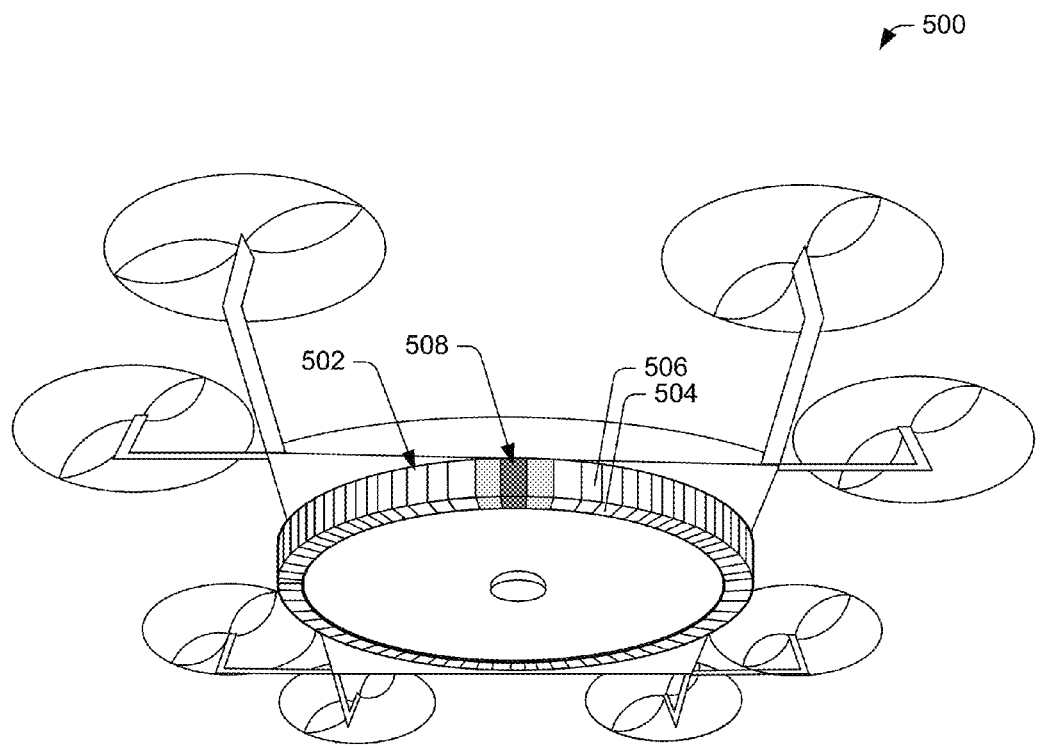
FIG. 5 is a perspective view of an illustrative UAV that includes an array of lights to provide information regarding at least an approach of the UAV to a destination.

FIG. 5 is a perspective view of an illustrative UAV 500 that includes an array of lights 502 to provide information regarding an approach of the UAV to a destination. The array of lights 502 may include lighting elements or pixels that can be individually controlled to create a lighting effect. The array of lights 502 may be configured to at least partially surround the UAV 500 and/or be visible from different locations from the UAV 500 or under the UAV 500. For example, the lights 502 may include a first surface 504 that is parallel or substantially parallel with the ground when the UAV is hovering and a second surface 506 that is perpendicular to the first surface 504 and viewable from a distance away from, but not under, the UAV 500. The lights 502 may be coupled to a body or fuselage of the UAV 500, and may be coupled to structures, such as a support frame, a "bumper" that surrounds the UAV 500, and/or other features of the UAV 500.

During operation, the lights 502 may be selectively activated to emit light to provide indications, messages, graphical effects, entertainment, and/or other information to people, such as bystanders, property residents, and other people. In some embodiments, the lights 502 may emit different colored light which represents different information. For example, green for "good", yellow or orange for "caution", and red for "danger". As another example, green may be used for initial approach, yellow for an imminent landing or dropping a package, and red for during the final part of landing or dropping a package. However, other colors may be used and/or the colors may indicate other types of information. In various embodiments, the lights 502 may be pulsed to provide information to a person. For example, as the UAV 500 gets closer to a destination, the pulses of light may become faster, and may possibly end with steady light when the UAV is over or at the destination 106. Of course, the pulses may be used to convey other information.

In some embodiments, the lights 502 be sequenced on/off either singly or with other lights, such as to create animation and/or illuminate lights in a particular direction for a particular reason. For example, one or more lights 508 may be illuminated on a side of the UAV nearest or facing a person to indicate to the person that the UAV 500 has identified the presence of the person. As the person or UAV moves, the lights 508 may "follow" the person, such as by having other ones of the lights 502 illuminate to maintain light emission on a side of the UAV proximate to or facing the person. Similarly, the lights 502 may be illuminated on a side of the UAV nearest an obstacle to indicate to a person that the UAV has identified the presence of the obstacle. In some instances, the lights 502 may animate to show a convergence at the location proximate to the obstacle, which may enable a person located on a different side of the UAV to determine presence of the lights. For example, first lights on an opposite side of the UAV from the obstacle may initially be activated. Next, second lights adjacent to those first lights may be illuminated, then third lights adjacent to the second lights, and so forth until the lights are illuminated that are proximate to the obstacle, thereby creating an animation of lights that converge at a location proximate to the obstacle (or some other thing, such as a person, an intended drop zone, etc.).

The lights 502 may be used to communicate a unique identifier of the UAV 600, which may be readable by other UAVs, by a personal device, or by other devices that deploy an image recognition algorithm that can read or translate detected activation of lights into a unique identifier for the UAV 104. For example, the activation of lights may resemble a barcode or other image code that is scannable or otherwise convertible into an alpha-numeric code associated with the UAV 104.

Figure 6:
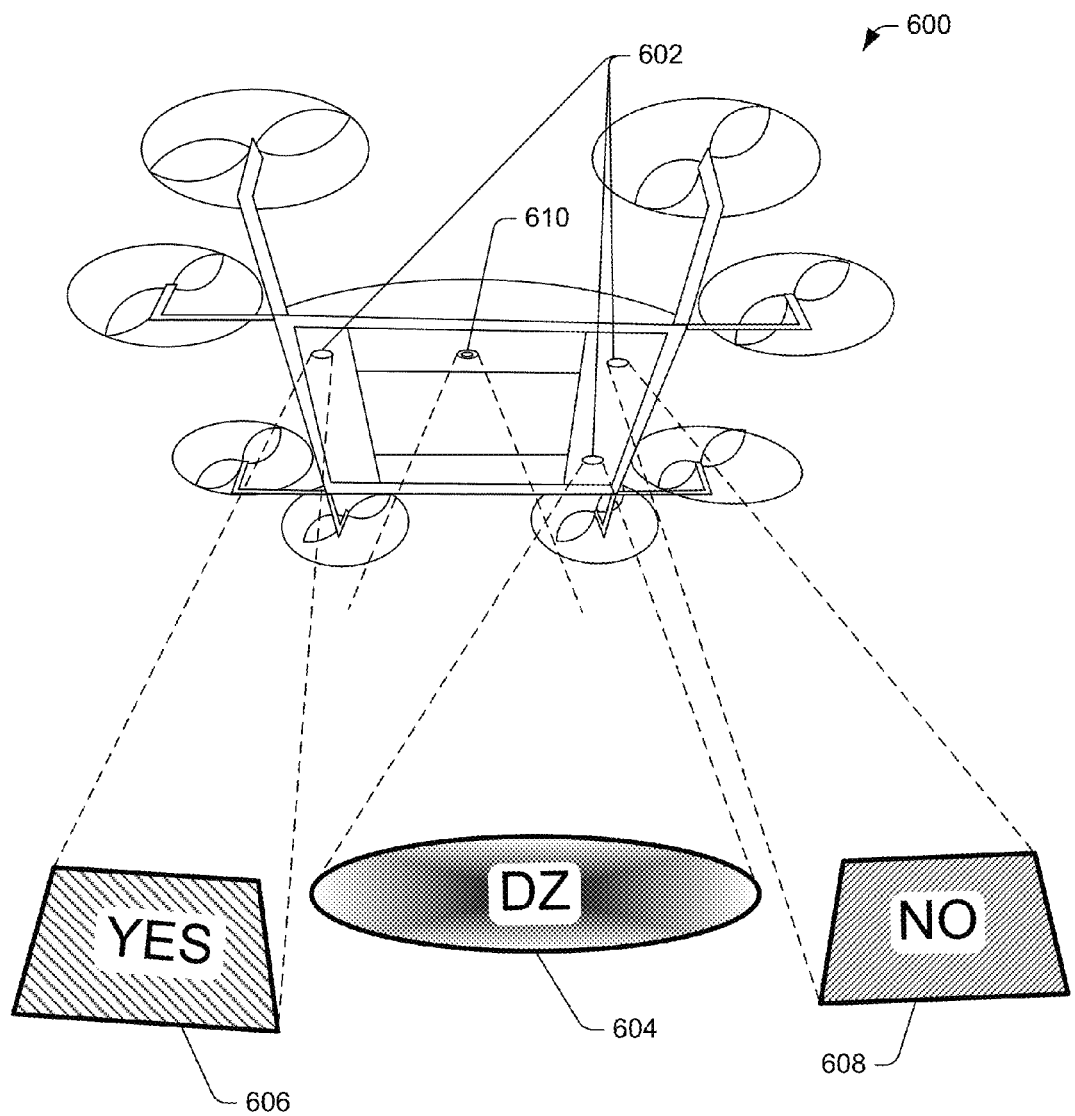
FIG. 6 is a perspective view of an illustrative UAV that includes one or projectors to project approach information on one or more surfaces of a destination.

FIG. 6 is a perspective view of an illustrative UAV 600 that includes one or projectors 602 to project approach information on one or more surfaces, such as the ground in or around a destination. The projectors 602 may include laser projectors light emitting diode (LED) projectors, and/or other powerful light emitting projectors that emit a concentration of light on a surface that is visible during at least some daylight conditions. The projection may be limited to lighting conditions present at the destination when the UAV 600 arrives or approaches the destination. For example, projecting content may be difficult or have poor results at high noon on a sunny day. However, projection may work in shaded location and/or in the early morning or late evening, as well as at night.

In some embodiments, the projectors 602 may project light on a surface or the ground to depict or show a drop zone (DZ) 604. The drop zone may be labeled as such, and/or may include other information, such as a warning to stay clear and/or other information by way to projected text and/or imagery. The UAV 600 may determine coordinates where the drop zone 604 is supposed to be located, and then project the light on that location when the UAV is near that location and able to project light on the location.

The projection may communicate information to a person. For example, the projection may include text, identify an obstacle, request action by a user (e.g., move, do something, etc.), and/or include other information. In various embodiments, the projectors 602 may project on a first area 606 and project on a second area 608. The areas 606 and 608 may include descriptions to provide information to a user, such as text and/or a boundary, or other information. The UAV 600 may image the area using an image sensor 610 to determine interaction with the areas by a person. For example, the UAV may announce a question to the person, such as "is this landing spot clear?" The projectors may project the word "yes" in the first area 606 and the word "no" in the second area 608. The UAV 600 may ask the user to stand in one of the areas to provide a response (or place an item in one of the areas, etc.). The image sensor 610 may image the projected areas 606 and 608, as well as other areas such as the drop zone 604 to determine interaction with any of the areas. If the person (or another designated object) move to one of the areas 606, 608, the UAV 600 may process this as a response to the question, and proceed accordingly. By communicating in this manner, the UAV may pose many questions and receive response through repeated use of this technique.

Figure 7:
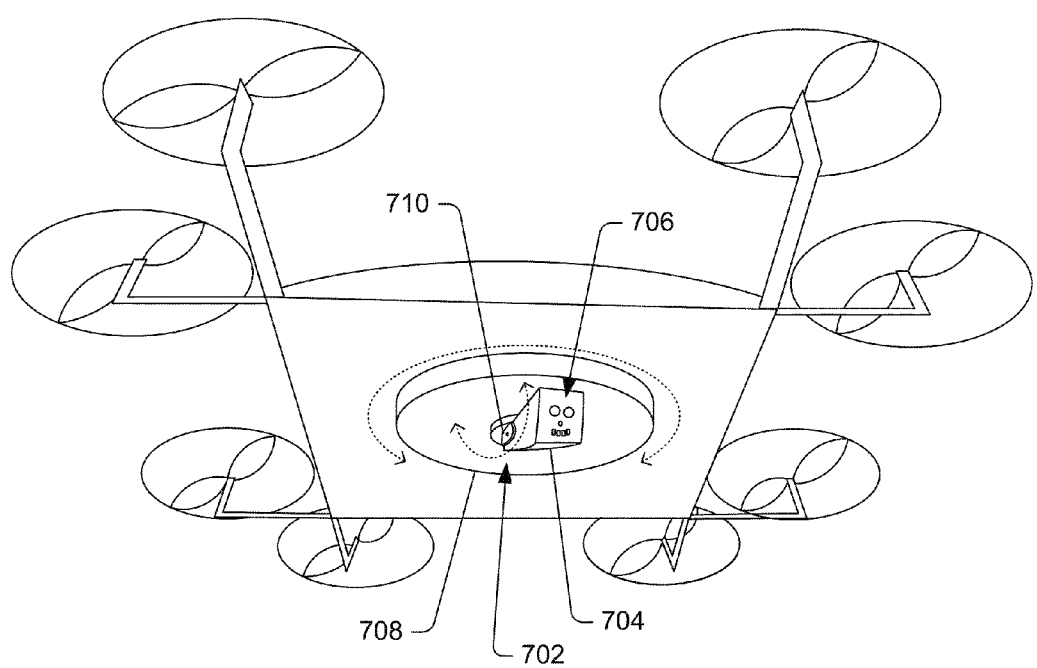
FIG. 7 is a perspective view of an illustrative UAV that includes a moveable mechanism to provide information regarding an approach of the UAV toward a destination.

FIG. 7 is a perspective view of an illustrative UAV 700 that includes a moveable mechanism 702 to provide information regarding an approach of the UAV to a destination. The moveable mechanism 702 may be a gimbaled mechanism or other type of mechanism that is coupled to the UAV 700 and can move/rotate relative to the UAV 700. The moveable mechanism 702 may include a body 704, which may have a primary surface 706, which may include one or more projector, light, image sensor, graphics (e.g., a face, etc.), and/or other features or sensors. The moveable mechanism 702 may rotate about a first axis via a first rotation device 708 and may rotate about a second axis that is perpendicular to the first axis via a second rotational device 710. The first and second rotational devices 708, 710 may enable directing the moveable mechanism 702 towards a person, object, obstacle, drop zone, areas (such as an area a person is requested to move to, etc.) and/or other area, which may communicate information to a person. In some embodiments, the moveable mechanism 702 may "track" movement of a person or obstacle (e.g., a dog), by changing position as the UAV moves relative to the person/obstacle such that the moveable mechanism 702 remains directed to the person/obstacle. The moveable mechanism 702 may be located underneath the UAV 700 or in other locations on the UAV 700. In some embodiments, the UAV 700 may include multiple moveable mechanism 702.

Figure 8:
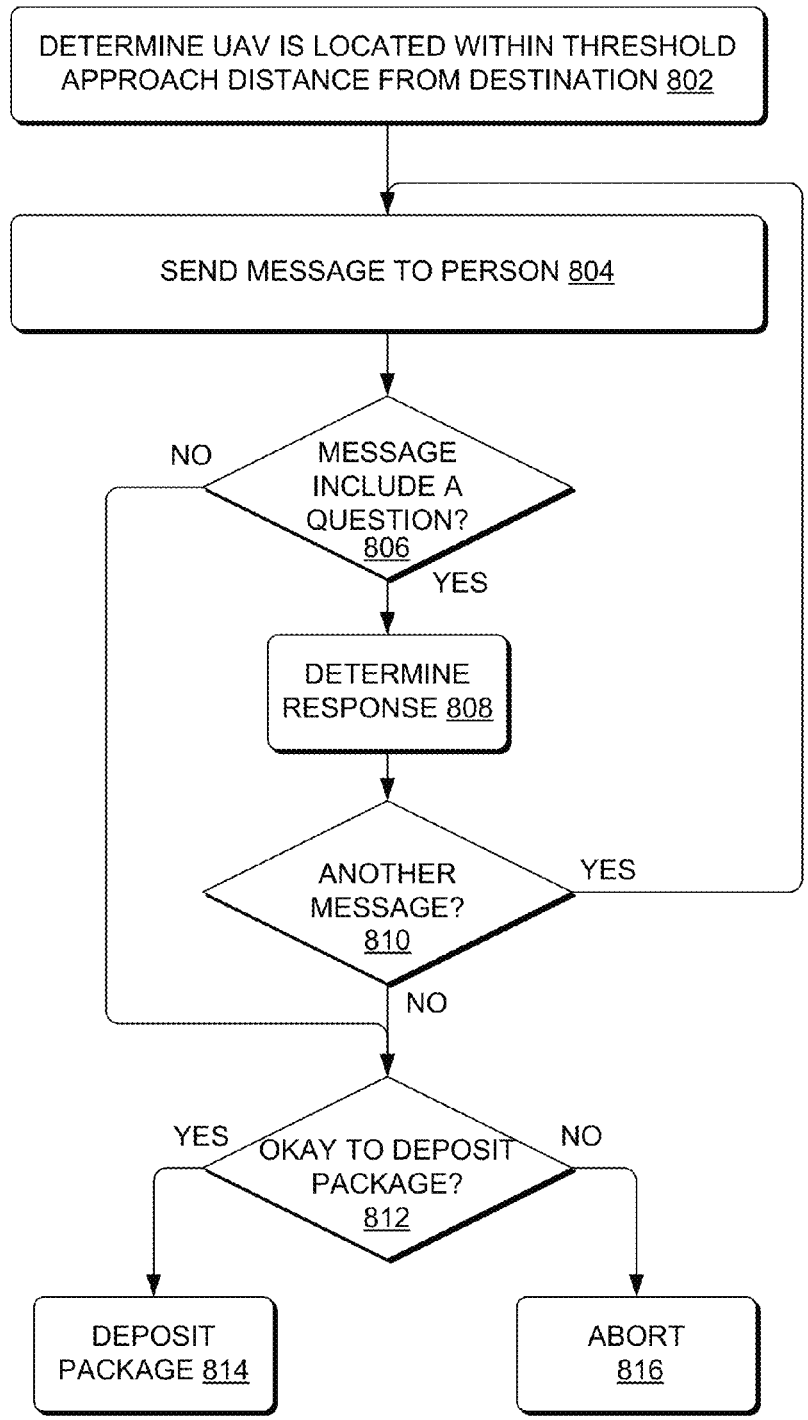
FIG. 8 is a flow diagram of an illustrative process to transmit one or more messages to a person at a destination during an approach of the UAV toward the destination.

FIG. 8 is a flow diagram of an illustrative process 800 to transmit one or more messages to a person at a destination during an approach of the UAV to the destination. The process 800 is described with reference to the environment 800 and the architectures 200.

At 802, the flight controller 114 may determine that the UAV 104 is located within a threshold approach distance from a destination, such as the destination 106. The operation 802 may be the same or similar to the operation 302 described above.

At 804, the communication module 120 may send a message to a person. For example, during an approach to the destination, the UAV 104 may transmit a SMS message, email, or other text-based message to a device associated with an intended recipient of the package 108. The communication module 120 may transmit messages using other techniques and message services, such as via a Bluetooth® protocol, a Wi-Fi protocol, and/or via other techniques. In various embodiments, the communication module 120 may communicate with the person 134 via other techniques, some of which are described below in more detail with reference to FIG. 9. The message may be provided by an audible speaker, a display of lights, a projection, and/or other output devices that enable the person 134 to receive the message.

In some embodiments, the message may include an image or other data provided by the UAV 104. For example, an image sensor of the UAV may capture an image of the destination as the UAV 104 approaches the destination 106 or flies over the destination. The UAV 104 may use an image analysis algorithm to determine one or more possible locations to drop the package 108 at the destination 106. In various embodiments, the image may be annotated to include designators for each possible location, which may enable user selection of one of the locations and/or approval/disapproval of a location. For example, the locations may be associated with different numbers and/or letters, which could be sent in a reply message to select a particular location. Of course, other designators and/or reply or acceptance actions may be used. In some embodiments, the image may be augmented to include additional information, such as an estimated time for dropping the package, locations of obstacles, requested action, and so forth. The image may include visible information, non-visible information (e.g., thermal imagery, infrared imagery, etc.), and/or other data to communicate useful and relevant approach information to a person.

At 806, the communication module 120 may determine with the message includes a question and solicits a response from the person. When the message includes a question (following the "yes" route from the decision operation 806), then the process 800 may advance to an operation 808 to determine a response to the question.

At 808, the response may be determined by receipt of a reply message, such as a reply email, SMS message, or other text-based message. In some embodiments, at 808, the response may be determined by imaging actions of the user, which are described below in more detail with reference to FIG. 9.

At 810, the communication module 120 may determine whether to send another message to the person. When the communication module 120 determines to send another message (following the "yes" route from the decision operation 810), then the process 800 may advance to the operation 804 described above, and the process 800 may continue accordingly.

When the communication module 120 determines not to send another message (following the "no" route from the decision operation 810) or when the message does not include a question (following the "no" route from the decision operation 806), then the process 800 may advance to a decision operation 812.

At 812, the UAV 104 may determine whether to deposit the package at the destination or a particular location at the destination (e.g., the drop zone 128). For example the UAV 104 may determine whether to deposit the package based on communications and/or exchanges of messages, via the communication module 120, with a person associated with the destination. When the UAV 104 determines to deposit the package (following the "yes" route from the decision operation 812), then the process may advance to an operation 814. At 814, the inventory engagement mechanism control 212 may deposit the package 108 at the destination 106. When the UAV 104 determines not to deposit the package (following the "no" route from the decision operation 812), then the process may advance to an operation 816. At 816, the UAV 104 may abort and may not deposit the package 108 at the destination 106 and/or may take other actions. In some embodiments, the interactions described with reference to operations 804-816 may enable a person to influence at least some control of the UAV.

Figure 9:
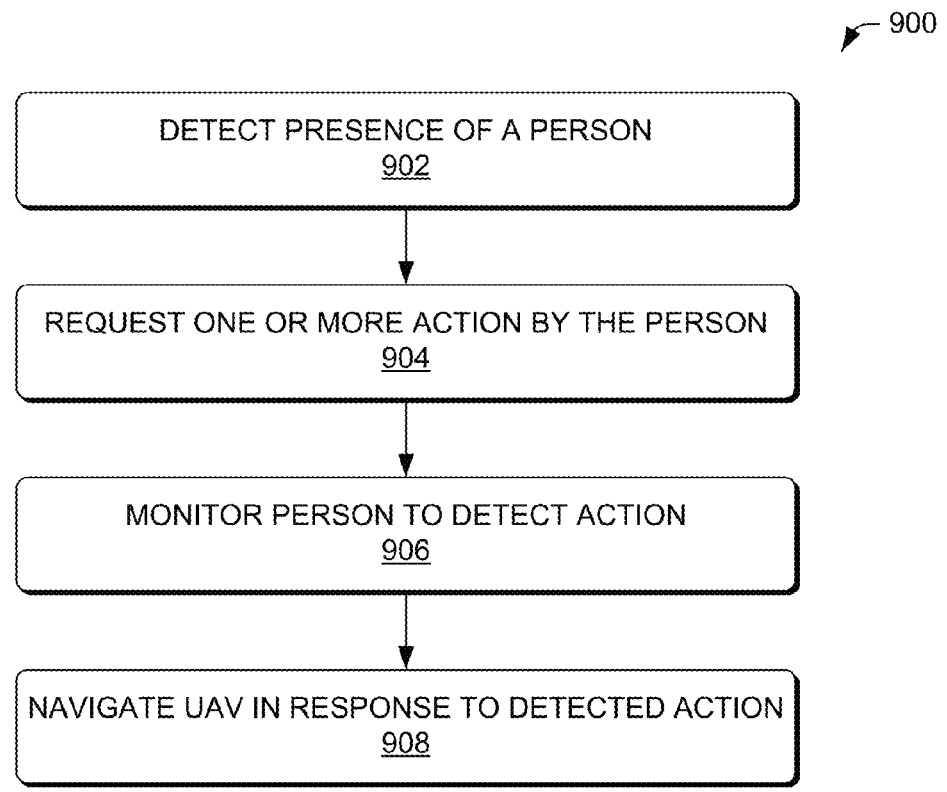
FIG. 9 is a flow diagram of an illustrative process to visually communicate with a person in sight of the UAV at the destination.

FIG. 9 is a flow diagram of an illustrative process 900 to visually communicate with a person in sight of the UAV at the destination. The process 900 is described with reference to the environment 100 and the architectures 200.

At 902, the object detection module 118 may detect the presence of person. For example, the object detection module 118 may analyze imagery of a destination area to identify the person, analyze thermal signatures of an area, analyze sounds, and/or perform other analysis to determine presence of a person at or near the destination.

At 904, the communication module 120 may provide one or more messages to the person requesting action by the person. The communication module 120 may send or provide the message using any of the techniques discussed herein, including sending a wireless message (e.g., SMS message, email, or other text-based message to a device associated with the person), emitting audio, emitting lights, projecting on a surface, and so forth.

At 906, the object detection module 118 may monitor the person to detect an action performed in response to the request from the operation 904. For example, referring back to FIG. 6, the object detection module 118 may determine if the person moves to the first area 606 or the second area 608 to determine an answer to a question, determine other information (e.g., where to drop the package, etc.), or for another reason, such as to clear an area for the approach of the UAV.

At 908, the flight controller 114 may navigate the UAV 104 in response to the detected action. For example, the flight controller 114 may cause the UAV to abort a task, to deposit the package 108, to move to a different location above the destination 106, to refrain from depositing the package or approaching an area at least temporarily, and/or perform other navigation. In some embodiments, the interactions described with reference to operations 902-908 may enable the person to influence at least some control of the UAV.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by an unmanned aerial vehicle (UAV) delivering a package to a destination, the method comprising:
   determining that a location of the UAV is within a threshold distance from a designated landing zone at the destination;
   identifying a person present in or proximate to the designated landing zone;
   selecting an approach indicator to communicate an operation of the UAV to the person;
   transmitting a message to the person, the message including a question to be responded to by an action performed by the person;
   determining that the person performed the action; and
   in response to the determining that the person performed the action, landing the UAV in the designated landing zone or at another location specified by the person via the action.

2. The method as recited in claim 1, wherein the transmitting the message to the person includes transmitting an electronic message from the UAV to a personal device associated with the person, the electronic message including an image that designates at least one possible location of the designated landing zone.

3. The method as recited in claim 1, wherein the approach indicator includes a projected display on the ground that is located proximate to the designated landing zone or creates the designated landing zone.

4. The method as recited in claim 1, wherein the approach indicator is at least one of:
   a flight control of the UAV to orient a specific side of UAV toward the person,
   a movement of a moveable mechanism on the UAV to direct the moveable mechanism toward the person, or
   a display of one or more lights that indicate a location of an obstacle present proximate to or within the designated landing zone.

5. The method as recited in claim 1, wherein the determining that the person performed the action includes determining movement of the person using an object recognition algorithm that processes signals captured by an image sensor.

6. An unmanned aerial vehicle (UAV) comprising:
   a propulsion system;
   a flight controller;
   one or more processors in communication with at least the propulsion system and the flight controller; and
   memory storing computer-executable instructions that, when executed, cause the one or more processors to perform acts to:
   determine that a location of the UAV is within a threshold distance from a destination;
   detect at least one of a person or an obstacle at the destination or adjacent to the destination;
   select an indicator to communicate an intention of the UAV to deposit a package at the destination based at least in part on presence of the at least one of the person or the obstacle; and
   cause an output device to provide the indicator prior to deposit of the package in at the destination.

7. The UAV as recited in claim 6, further comprising a projector, and wherein the indicator is a projection of a drop zone on a surface at the destination.

8. The UAV as recited in claim 6, further comprising a projector to project content on a surface, the projector configured to project a request for the person to take a specific action.

9. The UAV as recited in claim 8, further comprising an image sensor to capture imagery of the person, and wherein the one or more processors further perform acts to monitor, via analysis of imagery obtained by the image sensor, actions performed by the person to determine performance of the action by the person.

10. The UAV as recited in claim 6, further comprising an image sensor to detect the at least one of the person or the obstacle at the destination or adjacent to the destination, and wherein the one or more processors further perform acts to determine, via analysis of imagery obtained by the image sensor, an identity of the at least one of the person or the obstacle, the identity being an input to select the indicator.

11. The UAV as recited in claim 6, further comprising a moveable mechanism coupled to the UAV that is configured to move relative the UAV, and wherein the one or more processors further perform acts to cause the moveable mechanism to move in a direction toward a location of the at least one of the person or the obstacle.

12. The UAV as recited in claim 11, wherein the one or more processors further perform acts to cause the movable mechanism to track the location of the at least one of the person or the obstacle as the UAV moves relative to the person or the obstacle.

13. The UAV as recited in claim 6, further comprising a plurality of lights, and wherein the one or more processors further perform acts to cause activation of at least some lights of the plurality of lights that are facing the at least one of the person or the obstacle.

14. The UAV as recited in claim 13, wherein the one or more processors further perform acts to cause activation of other lights of the plurality of lights to track a location of the at least one of the person or the obstacle as the UAV moves relative to the person or the obstacle.

15. The UAV as recited in claim 6, wherein the one or more processors further perform acts to:
   transmit a wireless message to a device associated with the person;
   receive a response message from the device associated with the person; and determine, based at least in part on the response message, at least one of a location to deposit the package or a time to deposit the package.

16. A method comprising:
- determining that a location of an unmanned aerial vehicle (UAV) is within a threshold distance from a destination;
- detecting at least one of a person or an obstacle at the destination or adjacent to the destination;
- selecting a notification to communicate an intention of the UAV to deposit a package at the destination based at least in part on presence of the at least one of the person or the obstacle;
- outputting the notification to communicate the intention of the UAV to deposit the package at the destination; and
- depositing the package at the destination.

17. The method as recited in claim 16, wherein the outputting is performed in part by a projector, and further comprising projecting at least one of:
- a drop zone on a surface at the destination, or
- a request for the person to take a specific action.

18. The method as recited in claim 16, wherein the outputting is performed in part by a moveable mechanism coupled to the UAV that the UAV moves relative to a frame of the UAV, and further comprising moving the moveable mechanism in a direction toward a location of the at least one of the person or the obstacle as the notification to communicate the intention of the UAV.

19. The method as recited in claim 16, wherein the outputting is performed in part by a plurality of lights, and further comprising activating at least some lights of the plurality of lights that are facing the at least one of the person or the obstacle as the notification to communicate the intention of the UAV.

20. The method as recited in claim 16, further comprising:
- capturing imagery, via an image sensor, of the person or the obstacle; and
- identifying the person or the obstacle using an object recognition algorithm that processes the imagery.

* * * * *